United States Patent
Leufen et al.

(10) Patent No.: US 11,997,960 B2
(45) Date of Patent: Jun. 4, 2024

(54) HAND-GUIDED GARDENING, FORESTRY AND/OR CONSTRUCTION PROCESSING DEVICE AND METHOD FOR OPERATING A HAND-GUIDED GARDENING, FORESTRY AND/OR CONSTRUCTION PROCESSING DEVICE

(71) Applicant: Andreas Stihl AG & Co. KG, Waiblingen (DE)

(72) Inventors: Heinrich Leufen, Schwaikheim (DE); Philippe Buerckel, Waiblingen (DE); Simon Klaiber, Tamm (DE); Alexander Haas, Spraitbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 682 days.

(21) Appl. No.: 17/175,362

(22) Filed: Feb. 12, 2021

(65) Prior Publication Data
US 2021/0251151 A1 Aug. 19, 2021

(30) Foreign Application Priority Data

Feb. 14, 2020 (EP) .................................. 20157359

(51) Int. Cl.
*H02K 29/12* (2006.01)
*A01G 3/053* (2006.01)
*A01G 3/08* (2006.01)
*A01G 20/47* (2018.01)
*G05B 15/02* (2006.01)

(52) U.S. Cl.
CPC ............. *A01G 3/053* (2013.01); *A01G 3/085* (2013.01); *A01G 20/47* (2018.02); *G05B 15/02* (2013.01)

(58) Field of Classification Search
CPC ........ A01G 3/053; A01G 20/47; A01G 3/085; G05B 15/02; H02P 29/00
See application file for complete search history.

(56) References Cited

U.S. PATENT DOCUMENTS

2012/0191250 A1 7/2012 Iwata et al.
2012/0273242 A1 11/2012 Eshleman et al.
(Continued)

FOREIGN PATENT DOCUMENTS

DE 10 2015 211 119 A1 12/2015
EP 3162189 A2 * 5/2017 ............. A01D 89/00
(Continued)

OTHER PUBLICATIONS

German-language European Search Report issued in European Application No. 20157359.9 dated Aug. 5, 2020 with partial English translation (seven (7) pages).

*Primary Examiner* — Karen Masih
(74) *Attorney, Agent, or Firm* — Crowell & Moring LLP

(57) ABSTRACT

A hand-guided gardening, forestry and/or construction processing device includes a processing tool, an electric motor drive system, wherein the electric motor drive system is designed to drive the processing tool, a user-adjustable operating element, and a control device. The control device is designed to control a target slope rate of a rotational speed of the electric motor drive system in dependence on a position of the operating element according to at least one allocation in such a way that maximum target slope rates of the rotational speed differ for different positions.

17 Claims, 7 Drawing Sheets

(56) References Cited

U.S. PATENT DOCUMENTS

| | | |
|---|---|---|
| 2017/0190032 A1 | 7/2017 | Leong et al. |
| 2018/0115266 A1 | 4/2018 | Koniakowsky et al. |
| 2019/0227528 A1 | 7/2019 | Abbott et al. |
| 2019/0275657 A1 | 9/2019 | Lanquist |
| 2021/0124335 A1* | 4/2021 | Foerstner ............. A01D 46/253 |

FOREIGN PATENT DOCUMENTS

| | | |
|---|---|---|
| EP | 3 311 958 A1 | 4/2018 |
| WO | WO 2011/004902 A1 | 1/2011 |

* cited by examiner

HAND-GUIDED GARDENING, FORESTRY AND/OR CONSTRUCTION PROCESSING DEVICE AND METHOD FOR OPERATING A HAND-GUIDED GARDENING, FORESTRY AND/OR CONSTRUCTION PROCESSING DEVICE

CROSS REFERENCE TO RELATED APPLICATION

This application claims priority under 35 U.S.C. § 119 from European Patent Application No. 20157359.9, filed Feb. 14, 2020, the entire disclosure of which is herein expressly incorporated by reference.

BACKGROUND AND SUMMARY OF THE INVENTION

The invention relates to a hand-guided gardening, forestry and/or construction processing device and to a method for operating a hand-guided gardening, forestry and/or construction processing device of this kind.

The problem addressed by the invention is that of providing a hand-guided gardening, forestry and/or construction processing device and a method for operating a hand-guided gardening, forestry and/or construction processing device of this kind, each of which has improved characteristics.

The invention solves this problem by providing a hand-guided gardening, forestry and/or construction processing device and/or a method, in accordance with the independent claims. Advantageous developments and/or embodiments of the invention are described in the dependent claims.

The hand-guided gardening, forestry and/or construction processing device according to the invention comprises or has a processing tool, an electric motor drive system, a user-adjustable operating element, and a control device, in particular an electric control device. The electric motor drive system is designed or configured to drive the processing tool. The control device is designed or configured to control, in particular automatically control, a target slope rate, in particular a target slope rate with respect to time, in particular a value of the target slope rate, or a target rate of rise or target acceleration of a rotational speed of the electric motor drive system in dependence on a position, in particular on a value of the position, of the operating element according to or in accordance with at least one allocation in such a way that maximum target slope rates, in particular maximum target slope rates with respect to time, in particular values of the maximum target slope rate, or maximum target rates of rise or maximum target accelerations of the rotational speed, differ for different positions, in particular different values of the position.

This makes it possible for the maximum target slope rate to be set to different levels, in particular to a low or high level, by a user of the gardening, forestry and/or construction processing device by different settings of the operating element. In particular, the low-setting maximum target slope rate makes it possible to limit or restrict or reduce or even avoid rotation, in particular pitching, of the gardening, forestry and/or construction processing device, in particular when starting the electric motor drive system. In other words: this makes possible a gentle start. Thus, this makes possible low or even no stress on the user, in particular a wrist of the user. Thus, this makes possible a high level of comfort for the user. In addition or as an alternative, the ability to set the maximum target slope rate to a high level makes possible rapid attainment of a desired rotational speed.

In particular, the gardening, forestry and/or construction processing device can be a hand-held gardening, forestry and/or construction processing device. In addition or as an alternative, hand-guided, in particular hand-held, gardening, forestry and/or construction processing device can mean that the gardening, forestry and/or construction processing device can have a mass of at most 50 kilograms (kg), in particular of at most 20 kg, in particular of at most 10 kg, in particular of at most 5 kg, and/or of at least 1 kg, in particular of at least 2 kg.

The operating element can have at least three different positions. In particular, the operating element can be continuously user-adjustable.

The control device for control can be a controller unit for closed-loop control. In addition or as an alternative, the control device can have a microcontroller.

The target slope rate can be reached in a load-free state of the gardening, forestry and/or construction processing device, in particular of the electric motor drive system.

The allocation can be referred to as a limit or restriction of the target slope rate. In addition or as an alternative, the allocation can be set in a fixed way or predetermined at the factory or such that it cannot be specified by the user. As a further addition or alternative, the allocation can allocate the different maximum target slope rates to the different positions.

The different maximum target slope rates can each be greater than zero.

In a development of the invention, the control device is designed or configured to control, in particular automatically control, a target rotational speed, in particular a value of the target rotational speed, and the target slope rate of the rotational speed in order to achieve the target rotational speed of the electric motor drive system in dependence on the position according to the at least one allocation. In particular, the target slope rate can be reached in a load-free state of the gardening, forestry and/or construction processing device, in particular of the electric motor drive system. In addition or as an alternative, the allocation can allocate to the different positions at least one, in particular only one, in particular one single, target rotational speed, in particular only a single value of the target rotational speed. In addition or as an alternative, the target rotational speed can be greater than zero.

In one embodiment of the invention, the control device is designed to control the target rotational speed in dependence on the position according to the at least one allocation in such a way that target rotational speeds, in particular values of the target rotational speed, differ for different positions, in particular different values of the position. This makes it possible for the target rotational speed to be set differently by the user by means of different settings of the operating element. In particular, the allocation can allocate the different target rotational speeds to the different positions. In addition or as an alternative, the different target rotational speeds can each be greater than zero.

In one embodiment of the invention, the control device is designed to control the target rotational speed according to the at least one allocation in such a way that a minimum target rotational speed, in particular a value of the minimum target rotational speed, is at least 0.1 times, in particular at least 0.2 times, in particular at least 0.3 times, a maximum target rotational speed, in particular a value of the maximum target rotational speed. This makes it possible, on the one hand, to ensure that the processing tool is always driven at a rotational speed at which the processing tool can work correctly. On the other hand, the low-setting maximum target slope rate makes it possible, in particular in contrast to a high maximum target slope rate, for the effect of a jump in speed caused by the minimum target rotational speed when starting the electric motor drive system to be reduced. In particular, the allocation can allocate the minimum target rotational speed of at least 0.1 times, in particular at least 0.2 times, in particular at least 0.3 times, of the maximum target rotational speed. In addition or as an alternative, the minimum target rotational speed can be equal to the maximum target rotational speed.

In one embodiment of the invention, the control device is designed or configured to detect, in particular automatically detect, an actual rotational speed, in particular a value of the actual rotational speed, of the electric motor drive system. In particular, the control device is designed or configured to determine, in particular automatically determine, a rotational speed deviation, in particular a value of the rotational speed deviation, in particular a rotational speed difference, by comparing the detected actual rotational speed and the target rotational speed with one another, in particular by subtracting the actual rotational speed from the target rotational speed. Moreover, the control device is designed or configured to control, in particular automatically control, in particular according to the at least one allocation, in such a way that the target slope rate, in particular a value of the target slope rate, is the maximum target slope rate, in particular a value of the maximum target slope rate, when a deviation limit value is reached and/or exceeded by the rotational speed deviation determined, and is lower than the maximum target slope rate, in particular the value of the maximum target slope rate, when the deviation limit value is undershot by the rotational speed deviation determined. This makes it possible to achieve the target rotational speed. In particular, the deviation limit value can be independent of the position and/or can differ from zero. In addition or as an alternative, the deviation limit value can be equal to or lower than the minimum target rotational speed, where applicable.

In one embodiment of the invention, the control device is designed to control according to the at least one allocation in such a way that the target rotational speed, in particular a value of the target rotational speed, increases or rises over an adjustment range, in particular an adjustment travel, of the operating element from its starting position to its maximum position from a, in particular the, minimum target rotational speed, in particular a value of the minimum target rotational speed, to a, in particular the, maximum target rotational speed, in particular a value of the maximum target rotational speed. The increase, in particular a value of the increase, or rise changes by at most 20 percent (%) at least every 0.2 times the adjustment range, or does not change. In other words: the target rotational speed increases linearly from the minimum target rotational speed to the maximum target rotational speed over the adjustment range from its starting position to its maximum position. This makes it possible for the target rotational speed to be finely adjusted by the user. In particular, the starting position can differ from a minimum position or an OFF position of the operating element.

In a development, in particular an embodiment, of the invention, the control device is designed to control according to the at least one allocation in such a way that, for a low position or a starting position, a maximum target slope rate, in particular a value of the maximum target slope rate, is low, in particular minimal, in particular and a target rotational speed, in particular a value of the target rotational speed, is low, in particular minimal, and, for a high position or maximum position, a maximum target slope rate, in particular the value of the maximum target slope rate, is high, in particular maximal, in particular and a target rotational speed, in particular the value of the target rotational speed, is high, in particular maximal. This makes it possible for the maximum target slope rate, in particular and in each case the target rotational speed, to be set intuitively by the user. In particular, the allocation can allocate to the low position the low maximum target slope rate, in particular and the low target rotational speed, and the allocation can allocate to the high position the high maximum target slope rate, in particular and the high target rotational speed.

In one embodiment of the invention, a transition or rise from the low maximum target slope rate to the high maximum target slope rate extends over at least 0.1 times, in particular 0.2 times, in particular 0.3 times, an adjustment range, in particular an adjustment travel, of the operating element. In addition or as an alternative, a transition or rise, in particular the transition or rise, from the low maximum target slope rate to the high maximum target slope rate begins at most at half, in particular at a quarter, of the maximum position of the operating element. This, in particular the extent, makes it possible for the transition to be gentle or soft. In addition or as an alternative, this, in particular the beginning, makes it possible to achieve the transition quickly.

In a development of the invention, the control device is designed or configured to control, in particular automatically control, a second target slope rate, in particular a second target slope rate with respect to time, in particular a value of the second target slope rate, or a second target rate of rise of the target slope rate in dependence on the position of the operating element according to the at least one allocation in such a way that second maximum target slope rates, in particular second maximum target slope rates with respect to time, in particular values of the second maximum target slope rate, or second maximum target rates of rise of the target slope rate differ for different positions, in particular different values of the position. This makes it possible for the second maximum target slope rate to be set to different levels, in particular a low or high level, by the user by different settings of the operating element. In particular, the low-setting second maximum target slope rate makes it possible to limit or restrict or reduce or even avoid a jerk of the gardening, forestry and/or construction processing device, in particular when starting the electric motor drive system. In other words: this makes possible a gentle start. Thus, this makes possible low or even no stress on the user. In addition or as an alternative, the ability to set the second maximum target slope rate to a high level makes possible rapid attainment of a desired rotational speed. In particular, the target slope rate can be referred to as the first time derivative of the rotational speed, and the second target slope rate can be referred to as the second time derivative of the rotational speed. In addition or as an alternative, the second target slope rate can be reached in a load-free state of the gardening, forestry and/or construction processing device, in particular of the electric motor drive system. As a further addition or alternative, the allocation can allocate the different second maximum target slope rates to the different positions. As a further addition or alternative, the different second maximum target slope rates can each be greater than zero.

In a development of the invention, the control device is designed or configured to detect, in particular automatically detect, an adjustment duration, in particular a value of the adjustment duration, and/or an adjustment speed, in particular a value of the adjustment speed, of an adjustment of the operating element. Furthermore, the control device is designed or configured to control, in particular automatically control, according to the allocation when a duration limit value is reached and/or exceeded by the adjustment duration detected and/or when a speed limit value is reached and/or undershot by the adjustment speed detected. Moreover, the control device is designed or configured to control, in particular automatically control, according to a further allocation when the duration limit value is undershot by the adjustment duration detected and/or when the speed limit value is exceeded by the adjustment speed detected, in such a way that a maximum target slope rate is higher for at least one of the different positions, in particular at least the different values of the position, than it would be according to the allocation, in particular is maximal. This makes it possible to enable the allocation or low maximum target slope rate or the further allocation or high maximum target slope rate to be set by the user by adjustment of the operating element at different speeds. In particular, the ability to set the maximum target slope rate to a high level makes possible rapid attainment of a desired rotational speed. In particular, the further allocation can allocate to the at least one of the different positions the maximum target slope rate which is higher than that according to the allocation. In addition or as an alternative, control according to the further allocation, in particular the further allocation, can furthermore correspond, in particular can be equivalent, in other respects to control according to the allocation, in particular to the allocation.

In a development of the invention, the gardening, forestry and/or construction processing device comprises or has a potentiometer. The operating element is designed or configured to adjust a value of an electric variable of the potentiometer. The control device is designed or configured to control the target slope rate in dependence on the value of the variable according to the at least one allocation in such a way that the maximum target slope rates of the rotational speed differ for different values of the variable. This allows control in dependence on the position. In particular, the potentiometer can have a Hall-effect sensor, and/or the variable can be a Hall voltage. As a further alternative, the variable can be an electric resistance. As a further addition or alternative, the allocation can allocate the different maximum target slope rates to the different values of the variable.

In a development the invention, the control device is designed or configured to control, in particular automatically control, a torque, in particular a value of the torque, produced by the electric motor drive system in order to achieve the target slope rate. This makes it possible to control the target slope rate.

In a development of the invention, the gardening, forestry and/or construction processing device is a saw, a pole pruner, a brushcutter, a blower, a leaf blower or a cut-off grinder.

The method according to the invention is designed or configured for operating a, in particular the, hand-guided gardening, forestry and/or construction processing device of the kind described above. The method comprises or has the following step: controlling, in particular automatically controlling, the target slope rate of the rotational speed of the electric motor drive system in dependence on the position of the operating element according to the at least one allocation in such a way by means of the control device that the maximum target slope rates of the rotational speed differ for the different positions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
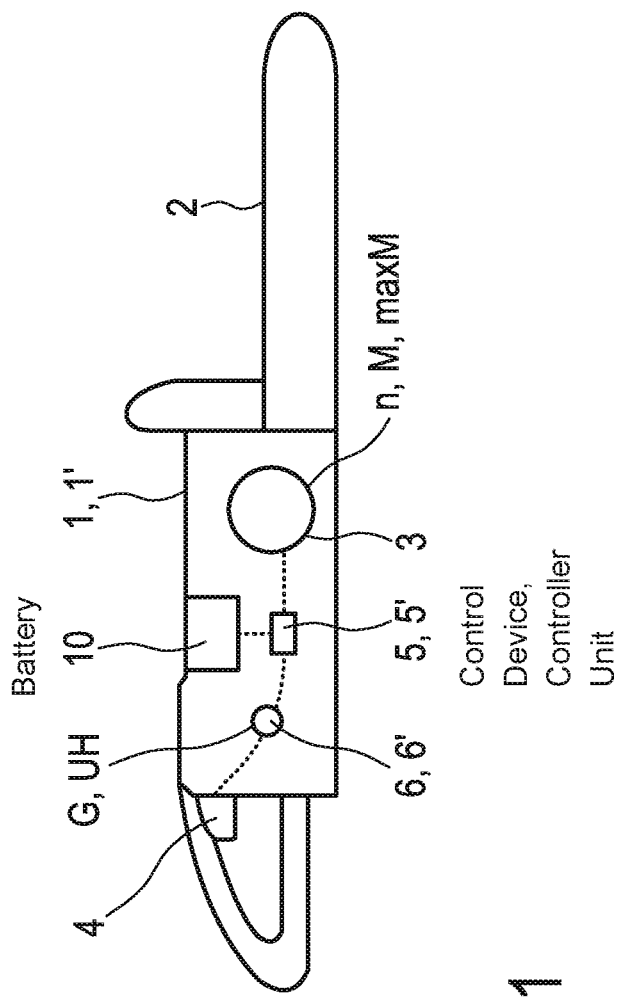
FIG. 1 shows schematically a hand-guided gardening, forestry and/or construction processing device according to the invention.

FIG. 1 shows a hand-guided gardening, forestry and/or construction processing device 1. The gardening, forestry and/or construction processing device 1 has a processing tool 2, an electric motor drive system 3, a user-adjustable operating element 4 and a control device 5. The electric motor drive system 3 is designed to drive, in particular drives, the processing tool 2. The control device 5 is designed to control, in particular controls, a target slope rate dnsoll/dt of a rotational speed n of the electric motor drive system 3 in dependence on a position of the operating element 4 according to at least one allocation ZO in such a way, as shown in FIG. 2, that maximum target slope rates maxdnsoll/dt of the rotational speed n differ for different positions ST, as shown in FIGS. 3 to 6.

Figure 2:
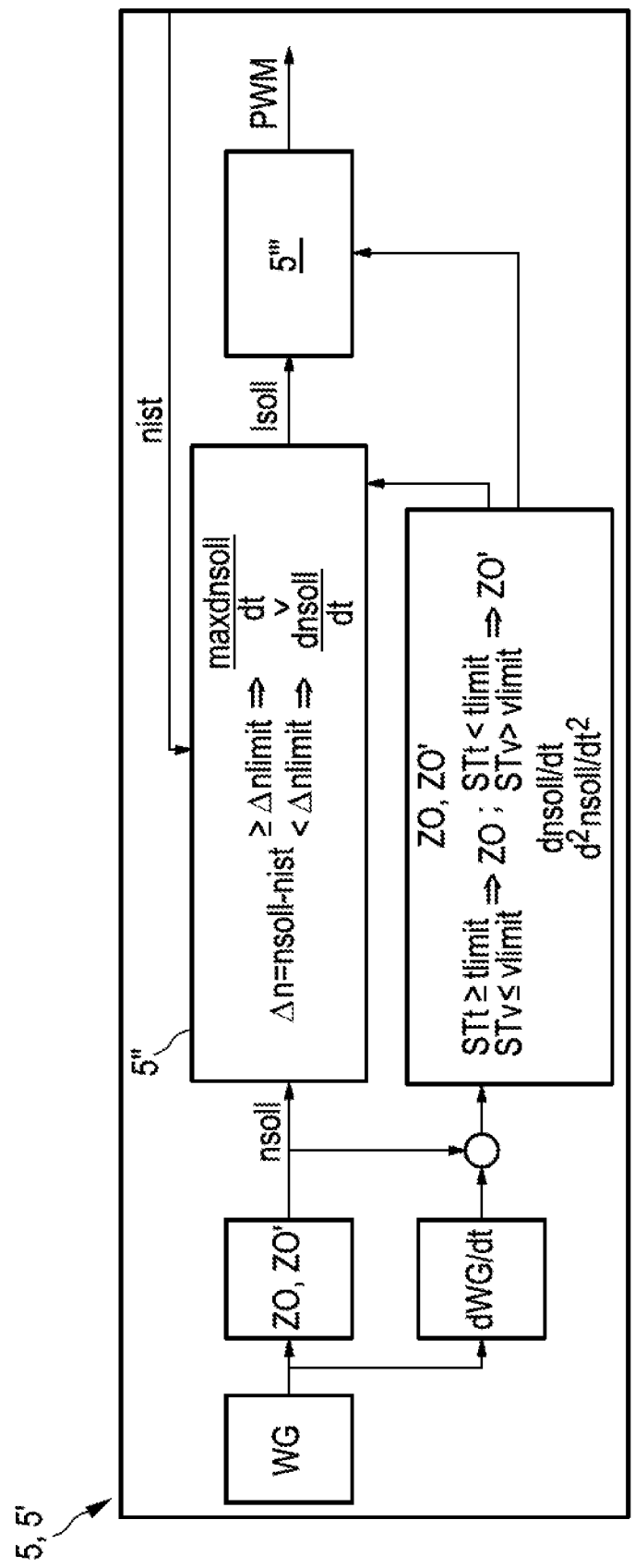
FIG. 2 shows schematically a control device of the gardening, forestry and/or construction processing device in FIG. 1 and a method according to the invention for operating the gardening, forestry and/or construction processing device in FIG. 1.

FIG. 2 shows a method for operating the hand-guided gardening, forestry and/or construction processing device 1. The method has the following step: controlling the target slope rate dnsoll/dt of the rotational speed n of the electric motor drive system 3 in dependence on the position ST of the operating element 4 according to the at least one allocation ZO in such a way by means of the control device 5 that the maximum target slope rates maxdnsoll/dt of the rotational speed n differ for the different positions ST.

In the exemplary embodiment shown, the gardening, forestry and/or construction processing device 1 is a saw 1'. In alternative exemplary embodiments, the gardening, forestry and/or construction processing device can be a pole pruner, a brushcutter, a blower, a leaf blower or a cut-off grinder.

Furthermore, the control device 1 is designed to control, in particular controls, a torque M produced by the electric motor drive system 3 in order to achieve the target slope rate dnsoll/dt.

In the exemplary embodiment shown, the gardening, forestry and/or construction processing device 1 furthermore has a potentiometer 6. The operating element 4 is designed to adjust, in particular adjusts, a value WG of an electric variable G of the potentiometer 6. The control device 5 is designed to control, in particular controls, the target slope rate dnsoll/dt in dependence on the value WG of the variable G according to the at least one allocation ZO in such a way that the maximum target slope rates maxdnsoll/dt of the rotational speed n differ for different values WG of the variable G.

In alternative exemplary embodiments, the gardening, forestry and/or construction processing device can have at least two switches, wherein the operating element can be designed to adjust the switches, wherein the control device can be designed to control the target slope rate dnsoll/dt in dependence on a respective switch position of the switches according to the at least one allocation in such a way that the maximum target slope rates of the rotational speed can differ for different switch positions.

In particular, the potentiometer 6 in the exemplary embodiment shown has a Hall-effect sensor 6', and the variable G is a Hall voltage UH.

Figure 3:
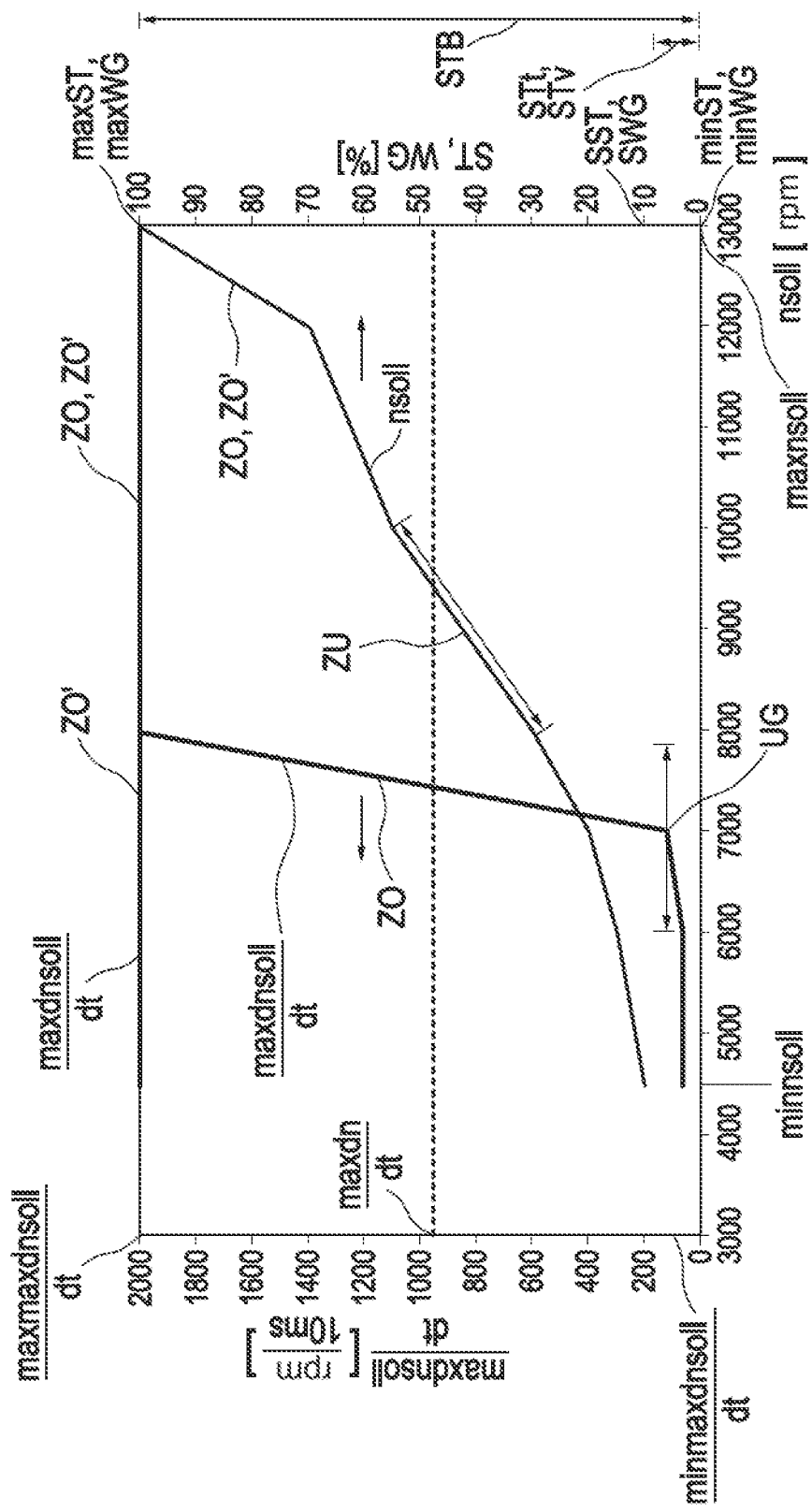
FIG. 3 shows a graph of a maximum target slope rate of a rotational speed against a target rotational speed of an electric motor drive system of the gardening, forestry and/or construction processing device in FIG. 1, and of the target rotational speed against a value of an electric variable of a potentiometer of the gardening, forestry and/or construction processing device in FIG. 1.

Furthermore, the control device 5 is designed to detect, in particular detects, an adjustment duration STt and/or an adjustment speed STv of an adjustment of the operating element 4, in particular of the value WG of the variable G. Moreover, the control device 5 is designed to control, in particular controls, according to the allocation ZO when a duration limit value tlimit is reached and/or exceeded by the adjustment duration STt detected and/or when a speed limit value vlimit is reached and/or undershot by the adjustment speed STv. Furthermore, the control device 5 is designed to control, in particular controls, according to a further allocation ZO' when the duration limit value tlimit is undershot by the adjustment duration STt detected and/or when the speed limit value vlimit is exceeded by the adjustment speed STv detected, in such a way that a maximum target slope rate maxdnsoll/dt is higher for at least one of the different positions ST than it would be according to the allocation ZO, in particular is maximal, as shown in FIG. 3.

In the exemplary embodiment shown, for a low position SST, in particular a low value SWG of the variable G, the maximum target slope rate maxdnsoll/dt is higher than it would be according to the allocation ZO. For a high position maxST, in particular a high value maxWG of the variable G, the maximum target slope rate maxdnsoll/dt is the same as it would be according to the allocation ZO, in particular maximal.

In other respects, the further allocation ZO' is equivalent to the allocation ZO.

In particular, the further allocation ZO' can be the allocation ZO plus an offset, in particular a position-dependent offset, in particular an offset of the maximum target slope rate.

Figure 7:
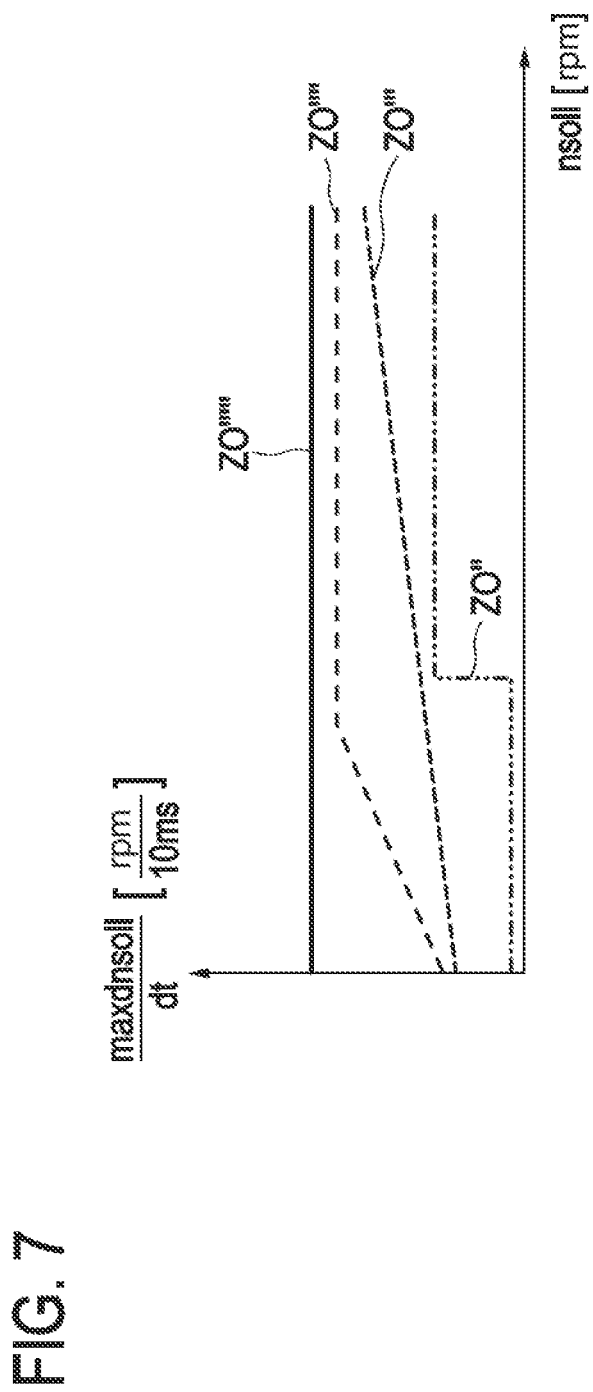
FIG. 7 shows a graph of offsets of the maximum target slope rate against the target rotational speed.

Further possible offsets ZO", ZO''', ZO'''', ZO''''' are shown by FIG. 7.

Moreover, the control device 5 is designed to control, in particular controls, a target rotational speed nsoll and the target slope rate dnsoll/dt of the rotational speed n in order to achieve the target rotational speed nsoll of the electric motor drive system 3 in dependence on the position ST, in particular on the value WG, according to the at least one allocation ZO, in particular or the further allocation ZO'.

In detail, the control device 5 is designed to control, in particular controls, the target rotational speed nsoll in dependence on the position ST, in particular on the value WG, according to the at least one allocation ZO, in particular or the further allocation ZO', in such a way that target rotational speeds nsoll differ for different positions ST, in particular different values WG of the variable G.

Furthermore, the control device 5 is designed to control, in particular controls, the target rotational speed nsoll according to the at least one allocation ZO, in particular or the further allocation ZO', in such a way that a minimum target rotational speed minnsoll is at least 0.1 times a maximum target rotational speed maxnsoll.

In the exemplary embodiment shown, the minimum target rotational speed minnsoll is 4500 revolutions per minute (rpm). In addition, the maximum target rotational speed maxnsoll is 13000 rpm.

Moreover, the control device 5 is designed to detect, in particular detects, an actual rotational speed nist of the electric motor drive system 3. Furthermore, the control device 5 is designed to determine, in particular determines, a rotational speed deviation Δn by comparing the detected actual rotational speed nist and the target rotational speed nsoll with one another. In addition, the control device 5 is designed to control, in particular controls, in particular according to the at least one allocation ZO, in particular or the further allocation ZO', in such a way that the target slope rate dnsoll/dt is the maximum target slope rate maxdnsoll/dt when a deviation limit value Δnlimit is reached and/or exceeded by the rotational speed deviation Δn determined, and is lower than the maximum target slope rate maxdnsoll/dt when the deviation limit value Δnlimit is undershot by the rotational speed deviation Δn determined.

In particular, the control device 5 for control is a controller unit 5' for closed-loop control.

In the exemplary embodiment shown, the controller unit 5' has a rotational speed controller 5'' and a current controller 5'''.

Furthermore, the deviation limit value Δnlimit is equal to or less than the minimum target rotational speed minnsoll.

Moreover, the control device 5 is designed to control, in particular controls, according to the at least one allocation ZO, in particular or the further allocation ZO', in such a way that the target rotational speed nsoll increases over an adjustment range STB of the operating element 4, in particular of the value WG, from its starting position SST, in particular a starting value SWG of the variable G, to its maximum position maxST, in particular a maximum value maxWG of the variable G, from the minimum target rotational speed minnsoll to the maximum target rotational speed maxnsoll. The increase ZU changes by at most 20% at least every 0.2 times the adjustment range STB, or does not change.

In the exemplary embodiment shown, the starting position SST, in particular the starting value SWG, is different from a minimum position minST of the operating element 4, in particular a minimum value minWG of the variable G.

In particular, the starting position SST, in particular the starting value SWG, is 10%. In addition, the maximum position maxST, in particular the maximum value maxWG, is 100%. As a further addition, the minimum position minST, in particular the minimum value minWG, is 0%.

Furthermore, the control device 5 is designed to control, in particular controls, according to the at least one allocation ZO in such a way that, for the low position or starting position SST, in particular the low value or starting value SWG, a maximum target slope rate maxdnsoll/dt is low, in particular minimal or a minimum maximum target slope rate minmaxdnsoll/dt, and, for the high position or maximum position maxST, in particular the high value or maximum value maxWG, a maximum target slope rate maxdnsoll/dt is high, in particular maximal or a maximum maximum target slope rate maxmaxdnsoll/dt.

In the exemplary embodiment shown, the minimum maximum target slope rate minmaxdnsoll/dt is 50 rpm per 10 milliseconds (ms). In addition, the maximum maximum target slope rate maxmaxdnsoll/dt is 2000 rpm per 10 ms.

In particular, the maximum maximum target slope rate maxmaxdnsoll/dt is higher than a maximum achievable slope rate maxdn/t of the rotational speed n, in the exemplary embodiment shown of 950 rpm per 10 ms. The maximum achievable slope rate maxdn/dt is limited by a maximum achievable torque maxM produced by the electric motor drive system 3.

Moreover, the control device 5 is designed to control, in particular controls, according to the at least one allocation ZO, in particular or the further allocation ZO', in such a way that, for the low position or starting position SST, in particular the low value or starting value SWG, a target rotational speed nsoll is low, in particular minimal or the minimum target rotational speed minnsoll, and, for the high position or maximum position maxST, in particular the high value or maximum value maxWG, a target rotational speed nsoll is high, in particular maximal or the maximum target rotational speed maxnsoll.

Figure 5:
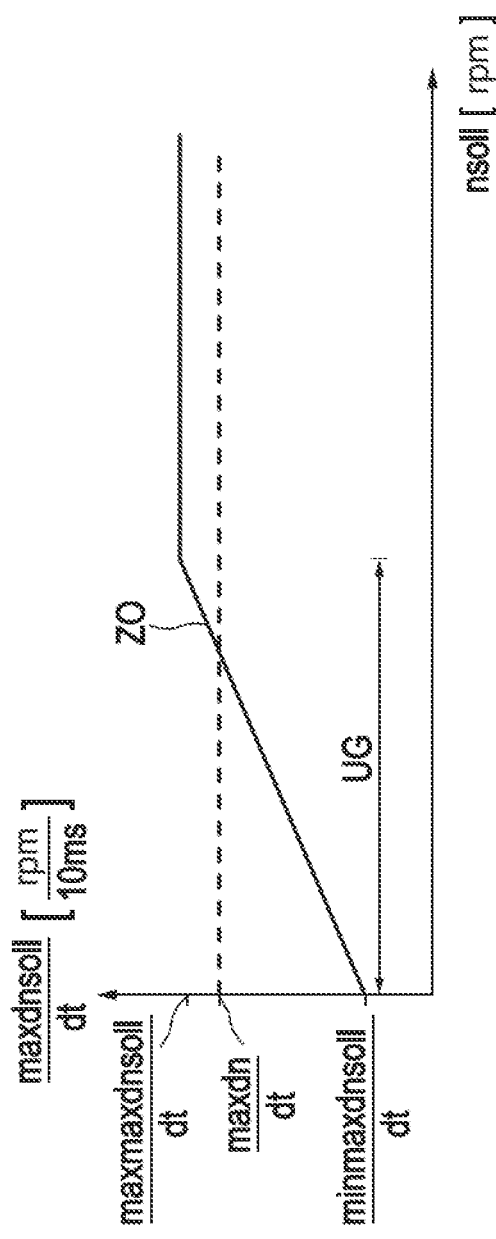
FIG. 5 shows yet another graph of the maximum target slope rate against the target rotational speed.
Figure 6:
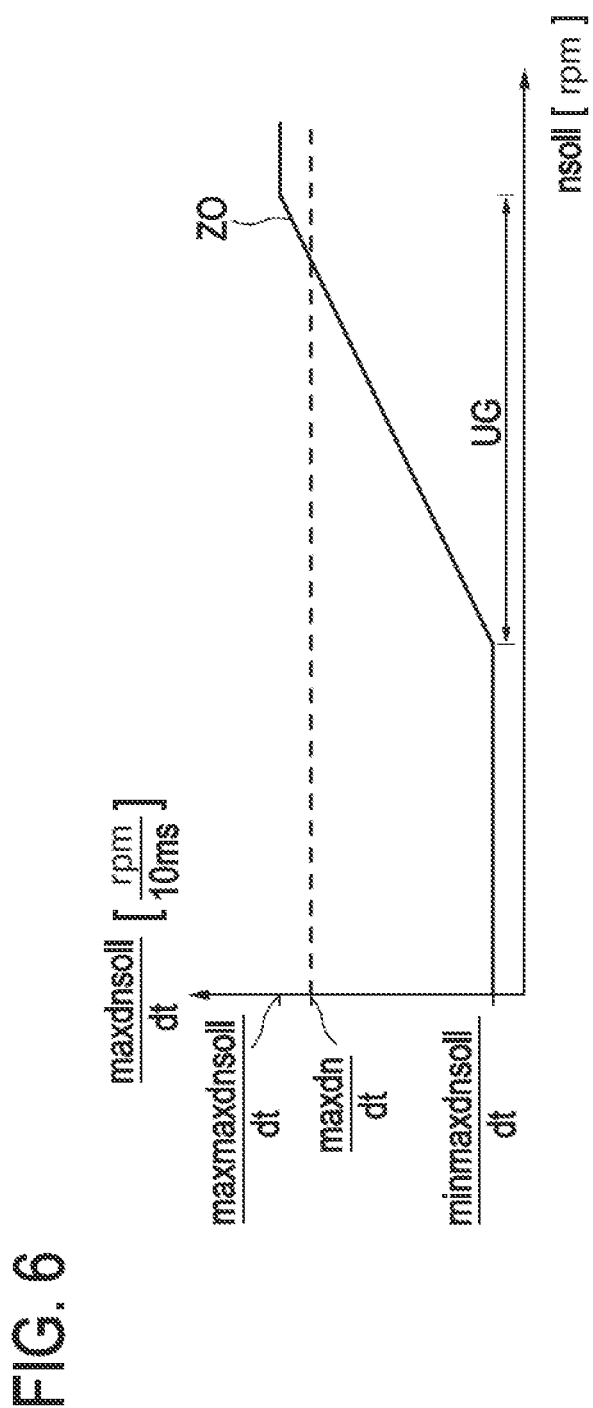
FIG. 6 shows yet another graph of the maximum target slope rate against the target rotational speed.

Furthermore, a transition UG from the low or minimum maximum target slope rate minmaxdnsoll/dt to the high or maximum maximum target slope rate maxmaxdnsoll/dt extends over at least 0.1 times the adjustment range STB of the operating element 4, in particular of the value WG, as shown in FIGS. 3, 5 and 6.

Figure 4:
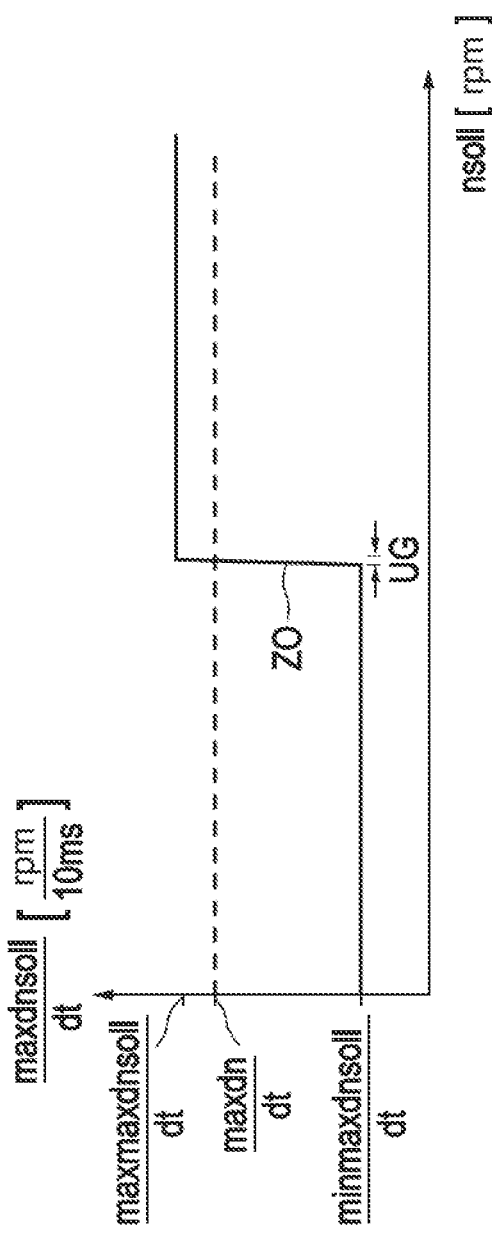
FIG. 4 shows another graph of the maximum target slope rate against the target rotational speed.

An alternative, in particular sharp, transition UG is shown in FIG. 4.

In addition, the transition UG from the low or minimum maximum target slope rate minmaxdnsoll/dt to the high or maximum maximum target slope rate maxmaxdnsoll/dt begins at most at half of the maximum position maxST of the operating element 4, in particular at half of the maximum value maxWG, as shown in FIGS. 3, 5 and 6.

In particular, the transition UG shown in FIG. 3 is effective in a wide range and gently between weak and strong acceleration but loses time in the case of acceleration to a high rotational speed since time is required for adjustment.

The transition UG shown in FIG. 4 is effective in a wide range but loses time in the case of acceleration to a high rotational speed since time is required for adjustment and is harsh.

The transition shown in FIG. 5 allows rapid acceleration and is gentle up to a high acceleration but requires a substantial adjustment to achieve its effect.

The transition shown in FIG. 6 is effective in a wide range and very gentle between weak and strong acceleration, but the weak acceleration is slow.

Figure 8:
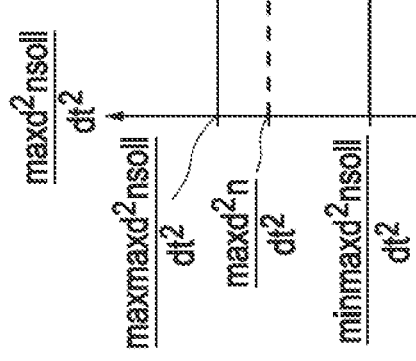
FIG. 8 shows a graph of a second maximum target slope rate of a target slope rate against the target rotational speed.

Moreover, the control device 5 is designed to control, in particular controls, a second target slope rate $d^2nsoll/dt^2$ of the target slope rate dnsoll/dt in dependence on the position ST of the operating element 4, in particular on the value WG, according to the at least one allocation ZO in such a way that second maximum target slope rates $maxd^2nsoll/dt^2$ of the target slope rate dnsoll/dt differ for different positions ST, in particular different values WG, as shown in FIG. 8.

In particular, the control device 5 is designed to control, in particular controls, according to the at least one allocation ZO in such a way that, for the low position or starting position SST, in particular the low value or starting value SWG, a second target slope rate $d^2nsoll/dt^2$ is low, in particular minimal or a minimum second target slope rate $mind2nsoll/dt^2$, and, for the high position or maximum position maxST, in particular the high value or maximum value maxWG, a second target slope rate $d^2nsoll/dt^2$ is high, in particular maximal or a maximum second target slope rate $maxd2nsoll/dt^2$.

In addition or as an alternative, the further allocation ZO' can be the allocation ZO plus an offset, in particular a position-dependent offset, in particular a second offset of the maximum target slope rate.

Figure 9:
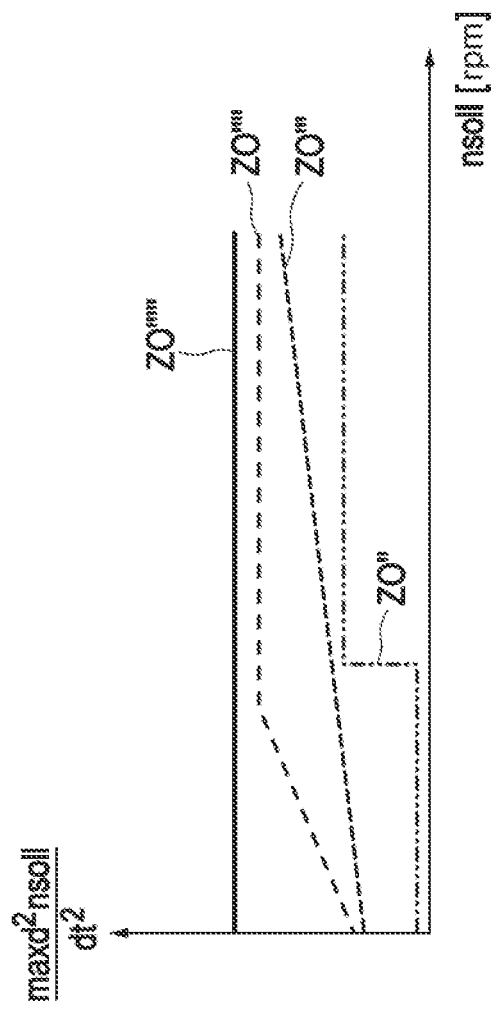
FIG. 9 shows a graph of second offsets of the maximum target slope rate against the target rotational speed.

Further possible offsets ZO'', ZO''', ZO'''', ZO''''' are shown by FIG. 9.

In the exemplary embodiment shown, the gardening, forestry and/or construction processing device 1 is designed for electric connection, in particular is electrically connected, to a rechargeable battery 10. In alternative exemplary embodiments, the gardening, forestry and/or construction processing device can additionally or alternatively be designed for electric connection to a cable.

As the exemplary embodiments shown and explained above make clear, the invention makes available an advantageous hand-guided gardening, forestry and/or construction processing device and a method for operating a hand-guided gardening, forestry and/or construction processing device of this kind, each of which has improved characteristics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided gardening, forestry and/or construction processing device, comprising:
   a processing tool;
   an electric motor drive system, wherein the electric motor drive system is configured to drive the processing tool;
   a user-adjustable operating element; and
   a control device, wherein the control device is configured to control a target slope rate of a rotational speed of the electric motor drive system in dependence on a position of the user-adjustable operating element according to at least one allocation such that maximum target slope rates of the rotational speed differ for different positions.

2. The hand-guided gardening, forestry and/or construction processing device according to claim 1, wherein
   the control device is configured to control a target rotational speed and the target slope rate of the rotational speed in order to achieve the target rotational speed of the electric motor drive system in dependence on the position according to the at least one allocation.

3. The hand-guided gardening, forestry and/or construction processing device according to claim 2, wherein
   the control device is configured to control the target rotational speed in dependence on the position according to the at least one allocation in such a way that target rotational speeds differ for different positions.

4. The hand-guided gardening, forestry and/or construction processing device according to claim 2, wherein
the control device is configured to control the target rotational speed according to the at least one allocation such that a minimum target rotational speed is at least 0.1 times a maximum target rotational speed.

5. The hand-guided gardening, forestry and/or construction processing device according to claim 2, wherein
the control device is configured to control the target rotational speed according to the at least one allocation such that a minimum target rotational speed is at least 0.3 times a maximum target rotational speed.

6. The hand-guided gardening, forestry and/or construction processing device according to claim 2, wherein
the control device is configured to detect an actual rotational speed of the electric motor drive system, to determine a rotational speed deviation by comparing the detected actual rotational speed and the target rotational speed with one another, and to control, according to the at least one allocation, in such a way that the target slope rate is the maximum target slope rate when a deviation limit value is reached and/or exceeded by the rotational speed deviation determined, and is lower than the maximum target slope rate when the deviation limit value is undershot by the rotational speed deviation determined.

7. The hand-guided gardening, forestry and/or construction processing device according to claim 2, wherein
the control device is configured to control according to the at least one allocation in such a way that the target rotational speed increases over an adjustment range of the user-adjustable operating element from its starting position to its maximum position from a minimum target rotational speed to a maximum target rotational speed, wherein the increase changes by at most 20% at least every 0.2 times the adjustment range, or does not change.

8. The hand-guided gardening, forestry and/or construction processing device according to claim 2, wherein
the control device is configured to control according to the at least one allocation in such a way that:
for a low position, a maximum target slope rate is low, and a target rotational speed is low, and,
for a high position, a maximum target slope rate is high, and a target rotational speed is high.

9. The hand-guided gardening, forestry and/or construction processing device according to claim 8, wherein
a transition from the low maximum target slope rate to the high maximum target slope rate extends over at least 0.1 times an adjustment range of the user-adjustable operating element, and/or
a transition from the low maximum target slope rate to the high maximum target slope rate begins at most at half of the maximum position of the user-adjustable operating element.

10. The hand-guided gardening, forestry and/or construction processing device according to claim 8, wherein
a transition from the low maximum target slope rate to the high maximum target slope rate extends over at least 0.3 times an adjustment range of the user-adjustable operating element, and/or
a transition from the low maximum target slope rate to the high maximum target slope rate begins at most at half of the maximum position of the user-adjustable operating element.

11. The hand-guided gardening, forestry and/or construction processing device according to claim 1, wherein
the control device is configured to control a second target slope rate of the target slope rate in dependence on the position of the user-adjustable operating element according to the at least one allocation such that second maximum target slope rates of the target slope rate differ for different positions.

12. The hand-guided gardening, forestry and/or construction processing device according to claim 1, wherein the control device is configured to:
detect an adjustment duration and/or an adjustment speed of an adjustment of the user-adjustable operating element,
control according to the allocation when a duration limit value is reached and/or exceeded by the adjustment duration detected and/or when a speed limit value is reached and/or undershot by the adjustment speed detected, and
control according to a further allocation when the duration limit value is undershot by the adjustment duration detected and/or when the speed limit value is exceeded by the adjustment speed detected, in such a way that a maximum target slope rate is higher for at least one of the different positions than it would be according to the allocation.

13. The hand-guided gardening, forestry and/or construction processing device according to claim 1, wherein
the gardening, forestry and/or construction processing device has a potentiometer,
the user-adjustable operating element is configured to adjust a value of an electric variable of the potentiometer, and
the control device is configured to control the target slope rate in dependence on the value of the variable according to the at least one allocation such that the maximum target slope rates of the rotational speed differ for different values of the variable.

14. The hand-guided gardening, forestry and/or construction processing device according to claim 1, wherein
the control device is configured to control a torque produced by the electric motor drive system in order to achieve the target slope rate.

15. The hand-guided gardening, forestry and/or construction processing device according to claim 1, wherein
the gardening, forestry and/or construction processing device is a saw, a pole pruner, a brushcutter, a blower, a leaf blower or a cut-off grinder.

16. A method for operating a hand-guided gardening, forestry and/or construction processing device, wherein the hand-guided gardening, forestry and/or construction device comprises:
a processing tool;
an electric motor drive system, wherein the electric motor drive system is configured to drive the processing tool;
a user-adjustable operating element; and
a control device,
wherein the method comprises:
controlling, via the control device, a target slope rate of a rotational speed of the electric motor drive system in dependence on a position of the user-adjustable operating element according to at least one allocation, wherein maximum target slope rates of the rotational speed differ for different positions.

17. A hand-guided gardening, forestry and/or construction processing device, comprising:
a processing tool;
an electric motor drive system, wherein the electric motor drive system is configured to drive the processing tool;

a user-adjustable operating element; and
a control device, wherein the control device is configured to control a target slope rate of a rotational speed of the electric motor drive system in dependence on a position of the user-adjustable operating element according to at least one allocation such that maximum target slope rates of the rotational speed differ for different positions,
wherein
the control device is configured to control a target rotational speed and the target slope rate of the rotational speed in order to achieve the target rotational speed of the electric motor drive system in dependence on the position according to the at least one allocation, and
the control device is configured to control according to the at least one allocation in such a way that:
for a low position, a maximum target slope rate is low, and a target rotational speed is low, and,
for a high position, a maximum target slope rate is high, and a target rotational speed is high.

* * * * *